United States Patent
Sun et al.

(10) Patent No.: US 11,032,822 B2
(45) Date of Patent: Jun. 8, 2021

(54) TIMER BASED UE SIDE BEAM SWEEPING FOR QUICK LINK BLOCKAGE RECOVERY

(71) Applicant: QUALCOMM Incorporated, San Diego, CA (US)

(72) Inventors: Jing Sun, San Diego, CA (US); Tao Luo, San Diego, CA (US); Makesh Pravin John Wilson, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 15/927,895

(22) Filed: Mar. 21, 2018

(65) Prior Publication Data
US 2018/0288757 A1 Oct. 4, 2018

Related U.S. Application Data

(60) Provisional application No. 62/481,082, filed on Apr. 3, 2017.

(51) Int. Cl.
*H04W 72/04* (2009.01)
*H04W 24/04* (2009.01)
(Continued)

(52) U.S. Cl.
CPC ........ *H04W 72/046* (2013.01); *H04B 7/0695* (2013.01); *H04B 7/088* (2013.01); *H04W 24/04* (2013.01)

(58) Field of Classification Search
CPC .................. H04W 72/046; H04W 24/04
See application file for complete search history.

(56) References Cited

U.S. PATENT DOCUMENTS

| 8,510,433 B2 | 8/2013 | Ramachandran et al. |
| 9,204,395 B2 | 12/2015 | Li et al. |

(Continued)

FOREIGN PATENT DOCUMENTS

| WO | 2017151876 A1 | 9/2017 |
| WO | 2018001362 A1 | 1/2018 |

OTHER PUBLICATIONS

Guangdong Oppo Mobile Telecom: "On Beam Recovery Mechanism," 3GPP Draft; R1-1704608, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Mar. 24, 2017, XP051250523, 5 pages, Retrieved from the Internet: URL: http://www.3gpp.org/ftp/tsg_ran/WG1_RL1/TSGR1_88b/Docs/ [retrieved on Mar. 24, 2017].

(Continued)

*Primary Examiner* — Charles C Jiang
*Assistant Examiner* — Voster Preval
(74) *Attorney, Agent, or Firm* — Arent Fox LLP

(57) ABSTRACT

A base station may maintain multiple beam pair links, with one being actively used for communication. The active beam pair may become blocked. Accordingly, it may be necessary to switch to another beam pair. The apparatus may be an apparatus for wireless communication. The apparatus for wireless communication may include a memory and at least one processor coupled to the memory. The at least one processor is configured to determine a set of active beam pairs including at least a first beam pair and a second beam pair and select the first beam pair. The at least one processor is also configured to predict that the first beam pair is blocked, the prediction based on an expiration of a timer and sweep through the set of active beam pairs based on predicting that the first beam pair is blocked.

20 Claims, 12 Drawing Sheets

(51) Int. Cl.
*H04B 7/06* (2006.01)
*H04B 7/08* (2006.01)

(56) References Cited

U.S. PATENT DOCUMENTS

| | | | |
|---|---|---|---|
| 9,414,285 B2 | 8/2016 | Hampel et al. | |
| 2011/0110453 A1* | 5/2011 | Prasad | H04B 7/088 375/285 |
| 2017/0280365 A1* | 9/2017 | Wang | H04B 7/0632 |
| 2017/0302341 A1* | 10/2017 | Yu | H04W 72/0446 |
| 2018/0049042 A1 | 2/2018 | Yu et al. | |
| 2018/0192384 A1* | 7/2018 | Chou | H04W 72/044 |
| 2018/0220450 A1* | 8/2018 | Aiba | H04W 72/0446 |
| 2018/0227899 A1 | 8/2018 | Yu et al. | |
| 2019/0074880 A1* | 3/2019 | Frenne | H04B 7/0626 |
| 2019/0081672 A1* | 3/2019 | Hwang | H04B 7/0486 |
| 2019/0165890 A1* | 5/2019 | Pietraski | H04B 7/0617 |
| 2019/0312628 A1 | 10/2019 | Bergstrom et al. | |
| 2020/0022040 A1 | 1/2020 | Chen et al. | |

OTHER PUBLICATIONS

Interdigital Communications: "On Beam Management for DL Control and Data Channels," 3GPP Draft; R1-1705505 Beam Management for Control and Data Channels, 3rd Generation Partnership Project (3GPP), Mobile Competence Centre; 650, Route Des Lucioles; F-06921 Sophia-Antipolis Cedex; F, vol. RAN WG1, No. Spokane, USA; Apr. 3, 2017-Apr. 7, 2017, Apr. 2, 2017, XP051243634, 4 pages, Retrieved from the Internet: URL: http://www.3gpp.org/ftp/Meetings_3GPP_SYNC/RAN1/Docs/ [retrieved on Apr. 2, 2017].
International Search Report and Written Opinion—PCT/US2018/023843—ISA/EPO—dated Jun. 20, 2018.
Astri et al., "Beam Blockage Detection and Recovery for NR MIMO", 3GPP Draft, R1-1705951, 3GPP TSG RAN WG1 Meeting #88bis, 3rd Generation Partnership Project (3GPP), Mobile Competence Centre, 650, Route Des Lucioles, F-06921, Sophia-Antipolis Cedex, France, vol. RAN WG1, No. Spokane, USA, Apr. 3, 2017-Apr. 7, 2017, Apr. 2, 2017 (Apr. 2, 2017), XP051244060, pp. 1-7, Retrieved from the Internet: URL:http://www.3gpp.org/ftp/Meetings_3GPP_SYNC/RAN1/Docs/ [retrieved on Apr. 2, 2017], Section 2.2, Figures 1, 2.

* cited by examiner

TIMER BASED UE SIDE BEAM SWEEPING FOR QUICK LINK BLOCKAGE RECOVERY

CROSS-REFERENCE TO RELATED APPLICATION(S)

This application claims the benefit of U.S. Provisional Application Ser. No. 62/481,082, entitled "TIMER BASED UE SIDE BEAM SWEEPING FOR QUICK LINK BLOCKAGE RECOVERY" and filed on Apr. 3, 2017, which is expressly incorporated by reference herein in its entirety.

BACKGROUND

Technical Field

The present disclosure relates generally to communication systems, and more particularly, to beam pair switching.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Such multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In some circumstances, a base station may maintain multiple beam pair links with a UE. One of the beam pair links may be being actively used for communication between the base station and the UE. When the beam pair link being actively used for communication between the base station and the UE is blocked, switching to another beam pair may be necessary.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

As discussed above, in some circumstances, a base station may maintain multiple beam pair links with a UE. One of the beam pair links may be being actively used for communication between the base station and the UE. When the beam pair link being actively used for communication between the base station and the UE is blocked, switching to another beam pair may be necessary.

Accordingly, in some aspects, base stations and UEs may change beam pairs by selected another beam pair from a set of beam pairs that are predetermined to be capable of providing communication between the base station and the UE. The set of beam pairs that are predetermined to be capable of providing communication between the base station and the UE may be a subset of all possible beam pairs. Furthermore, switching beam pairs may be made based on a UE side beam sweeping function.

In an aspect of the disclosure, a method, a computer-readable medium, and an apparatus are provided. The apparatus may be an apparatus for wireless communication. The apparatus for wireless communication may include a memory and at least one processor coupled to the memory. The at least one processor is configured to determine a set of active beam pairs including at least a first beam pair and a second beam pair and select the first beam pair. The at least one processor is also configured to predict that the first beam pair is blocked, the prediction based on an expiration of a timer and sweep through the set of active beam pairs based on predicting that the first beam pair is blocked.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
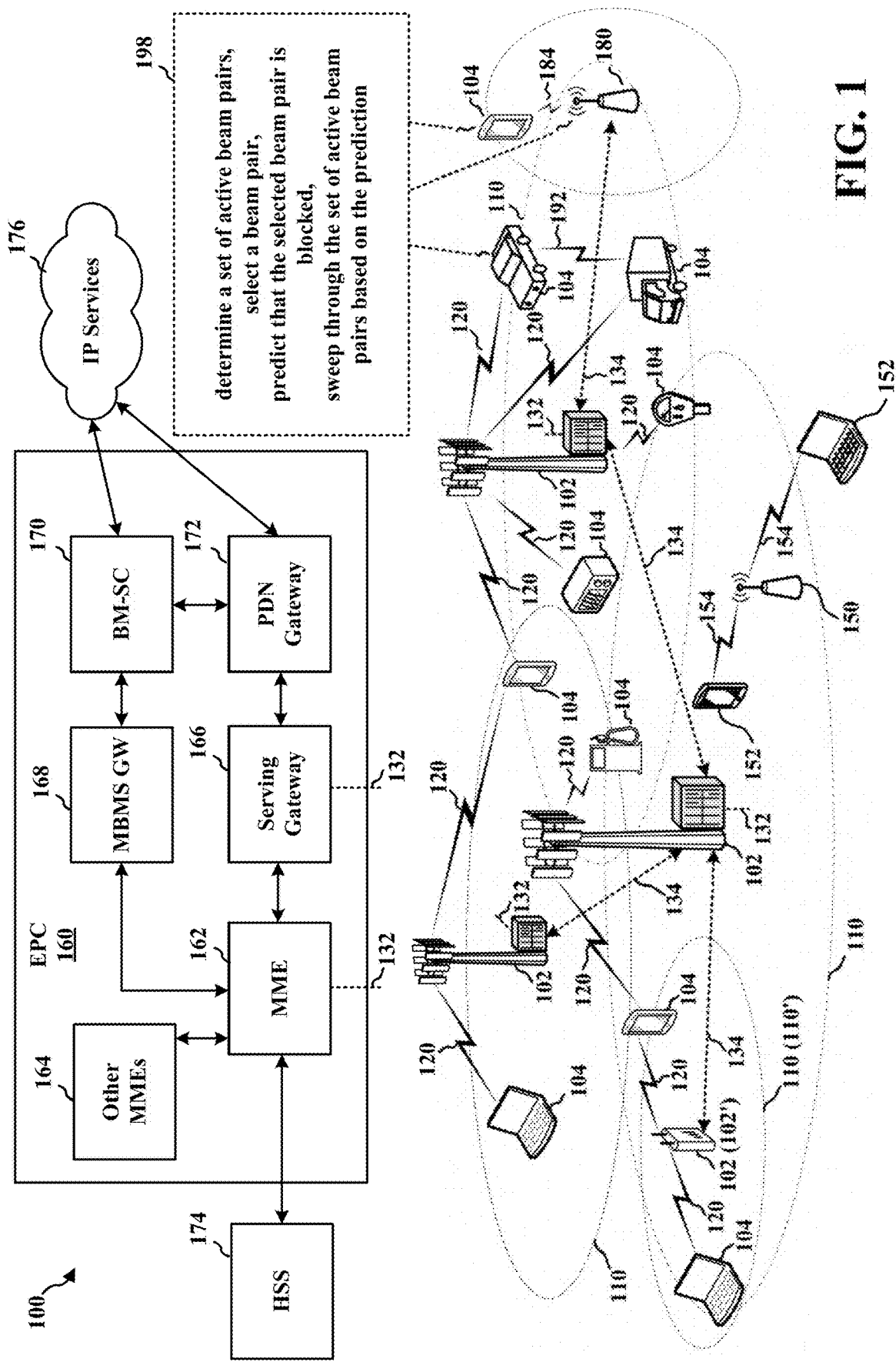
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). Such elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macrocells (e.g., high power cellular base stations) and/or small cells (e.g., low power cellular base stations). The macrocells include base stations. The small cells may include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell), and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as a mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 or base station 102, 180 may be configured to determine a set of active beam pairs including at least a first beam pair and a second beam pair. The UE 104 or base station 102, 180 may also be configured to select the first beam pair. Additionally, the UE 104 or base station 102, 180 may be configured to predict that the first beam pair is blocked, the prediction based on an expiration of a timer. The UE 104 or base station 102, 180 may also be configured to sweep through the set of active beam pairs based on predicting that the first beam pair is blocked (198).

Figure 2:
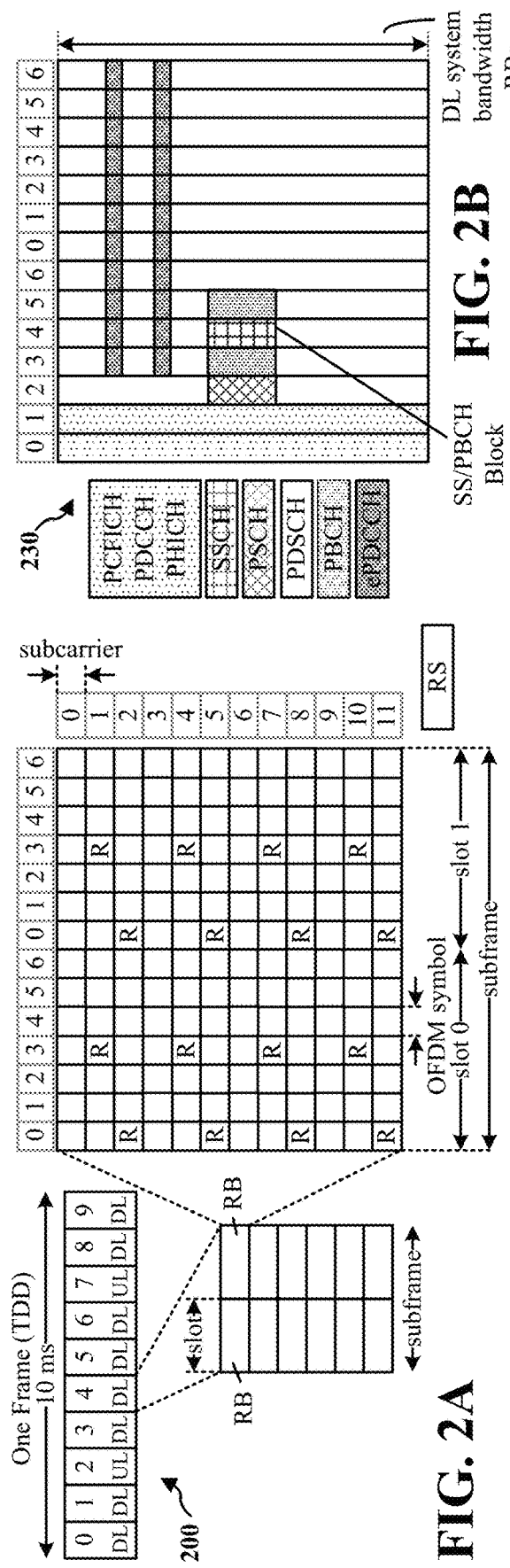
FIGS. 2A, 2B, 2C, and 2D are diagrams illustrating examples of a DL subframe, DL channels within the DL subframe, a UL subframe, and UL channels within the UL subframe, respectively, for a 5G/NR frame structure.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or maybe TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just a DL and subframe 7 is illustrated as providing just an UL; any particular subframe may be split into different subsets that provide both UL resources and DL resources. Note that the description infra also applies to a 5G/NR frame structure that is Frequency Division Duplex (FDD).

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where μ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0 and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries downlink control information (DCI). The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgment (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
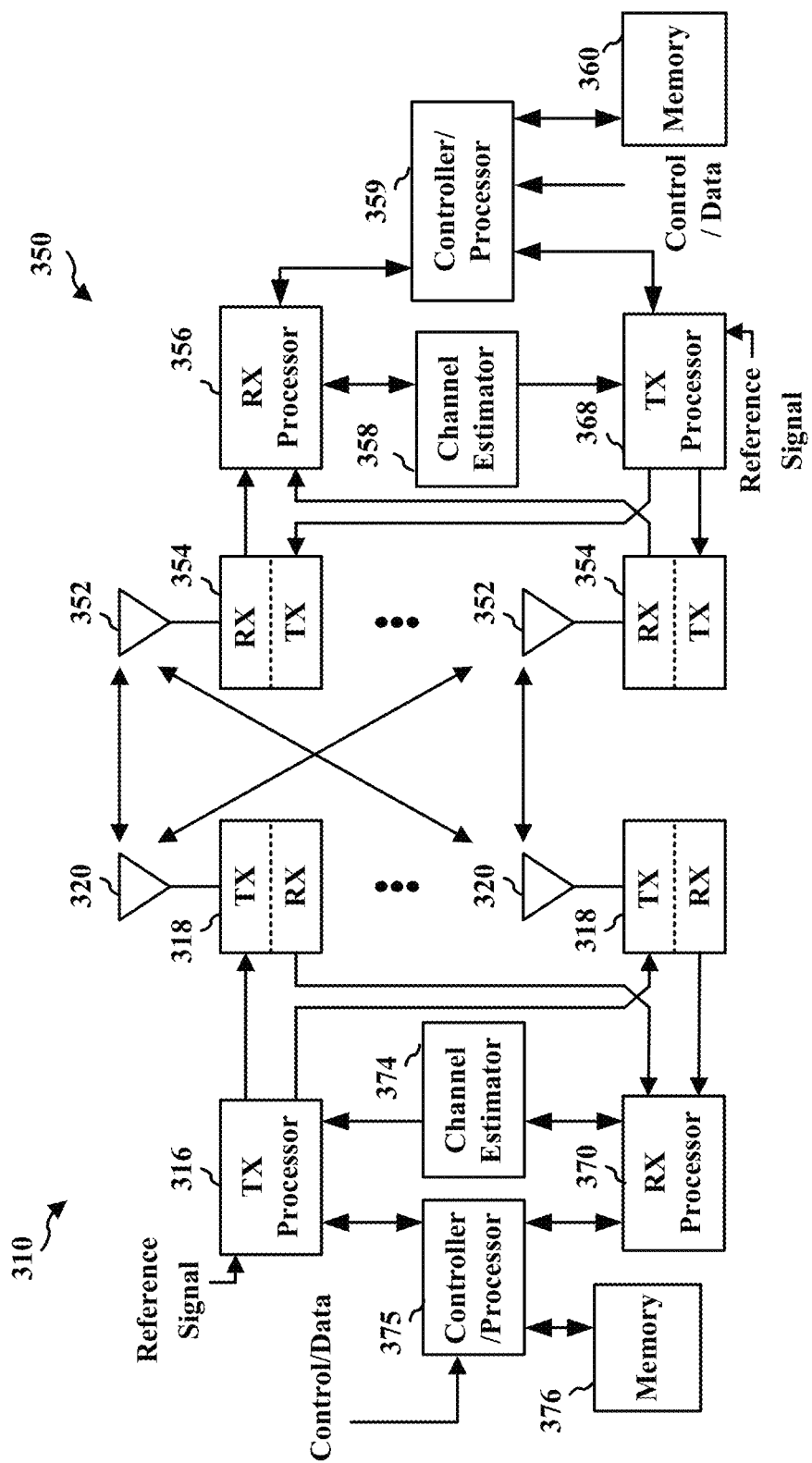
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from transmission blocks (TBs), scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier and the reference signal are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
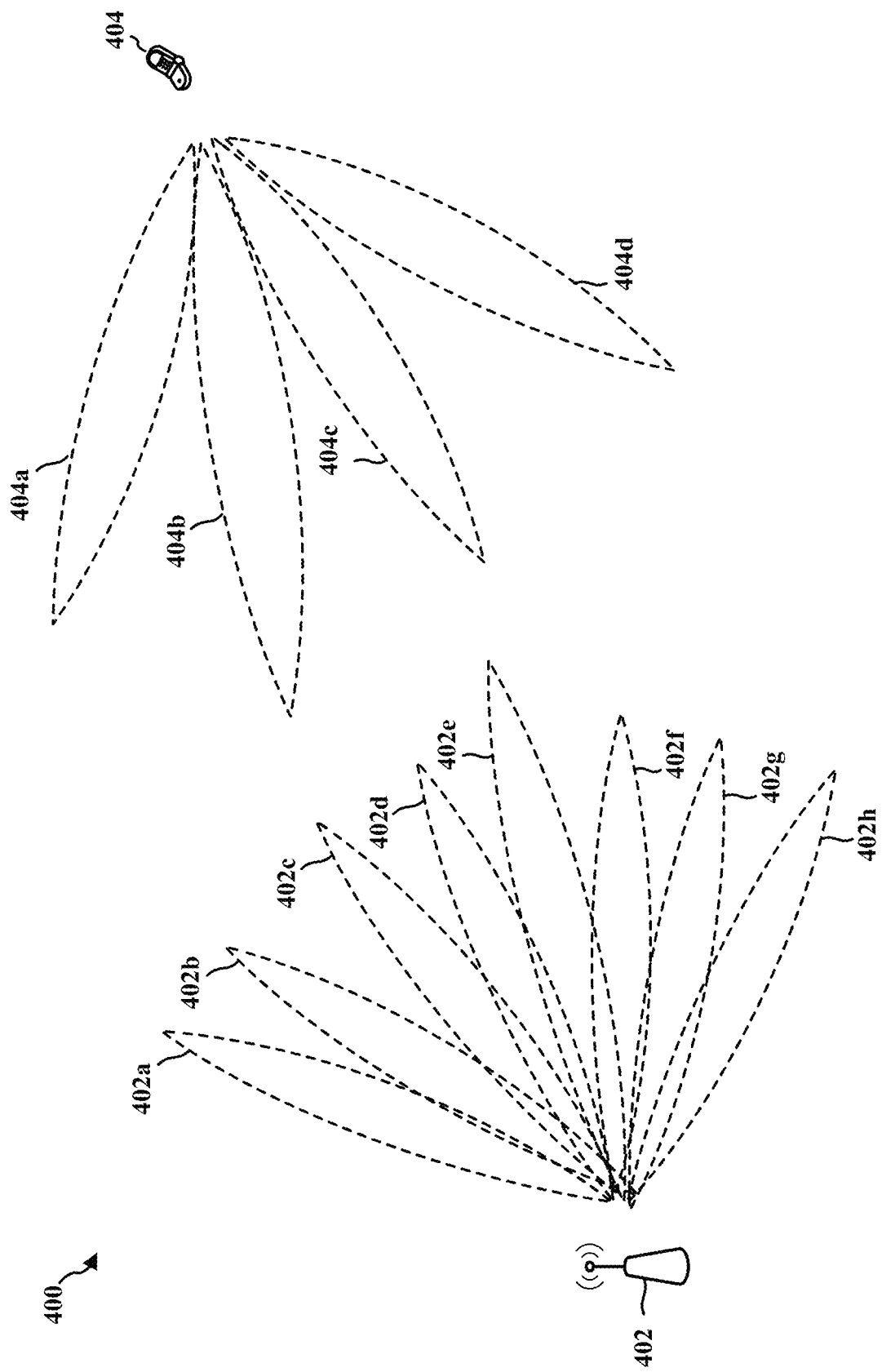
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In some communication systems, e.g., mmW communication systems, a base station may maintain multiple links (e.g., beam pairs) with a UE. In some examples, X may indicate the number of beam pairs. N may indicate the UE side beams involved in the X beam pairs. M may indicate the base station side beams involved in the X beam pairs. A link matrix is a matrix that indicates a beam pair with one base station side beam and one UE side beam. The link matrix may be a N×M matrix with X 1's. A 1 entry may indicate a beam pair with one base station side beam and one UE side beam. The link matrix may include more than one 1 in a row or column.

An aspect of the systems and methods described herein may be used to address a link blocking problem. A link blocking problem may occur when communication between a base station and a UE is lost on a beam pair currently used by the base station and the UE for communication. When one link is blocked suddenly, communication between the base station and the UE may be improved by switching to another beam quickly, e.g., within approximately 1 millisecond.

Some examples of the systems and methods described herein may schedule the UE to monitor different UE side beams periodically to monitor multiple PDCCH. The multiple PDCCH may each have a different UE side beam. The monitoring pattern may be designed such that all UE side beams in the beam pair set will be cycled through. Monitoring the other PDCCH(s) will take resources away from data transmission. Accordingly, monitoring the other PDCCH(s) may affect the data rate.

Figure 5:
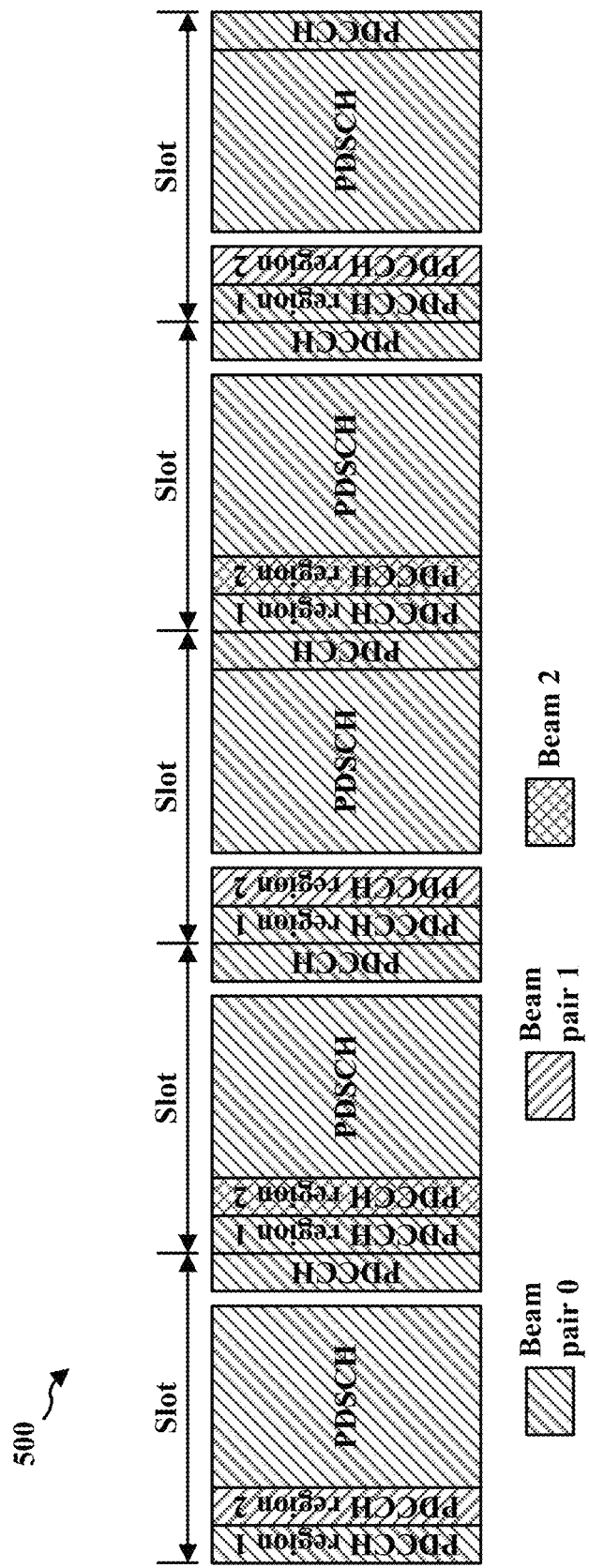
FIG. 5 is a diagram illustrating an example of a series of slots.

FIG. 5 is a diagram 500 illustrating an example of a series of slots. The example includes three beam pairs (e.g., Beam pair 0, Beam pair 1, Beam pair 2) in a set of active links or an "active link set." In the example, the three beam pairs (e.g., Beam pair 0, Beam pair 1, Beam pair 2) are of different strength, e.g., each beam pair may result in different received signal strength, signal-to-noise ratio, or some other figure of merit at the base station and/or the UE. In the example of FIG. 5, Beam pair 0 (Beam pair 0) may have the highest received signal strength, signal-to-noise ratio, or some other figure of merit.

The PDSCH/PUSCH may be served over Beam pair 0 (Beam pair 0). The PDCCH may carry DL/UL grant DCI in Beam pair 0 (Beam pair 0). Additionally, the PUCCH may carry UCI in Beam pair 0 (Beam pair 0).

On the UE side, the UE side beams for the three beam pairs may be Beam pair 0, Beam pair 1, and Beam pair 2 respectively. The UE may be configured to regularly monitor other beams so that when the base station determines or predicts that the main beam (e.g., Beam pair 0) is blocked, the prediction based on an expiration of a timer, the base station has an opportunity to send a beam switching command to the UE to switch to another beam. Regularly monitoring other beams has a cost, however. The cost may be a result of the tune away from the main serving beam for other beam monitoring. The tune away from the main serving beam for other beam monitoring may incur a constant overhead.

Figure 6:
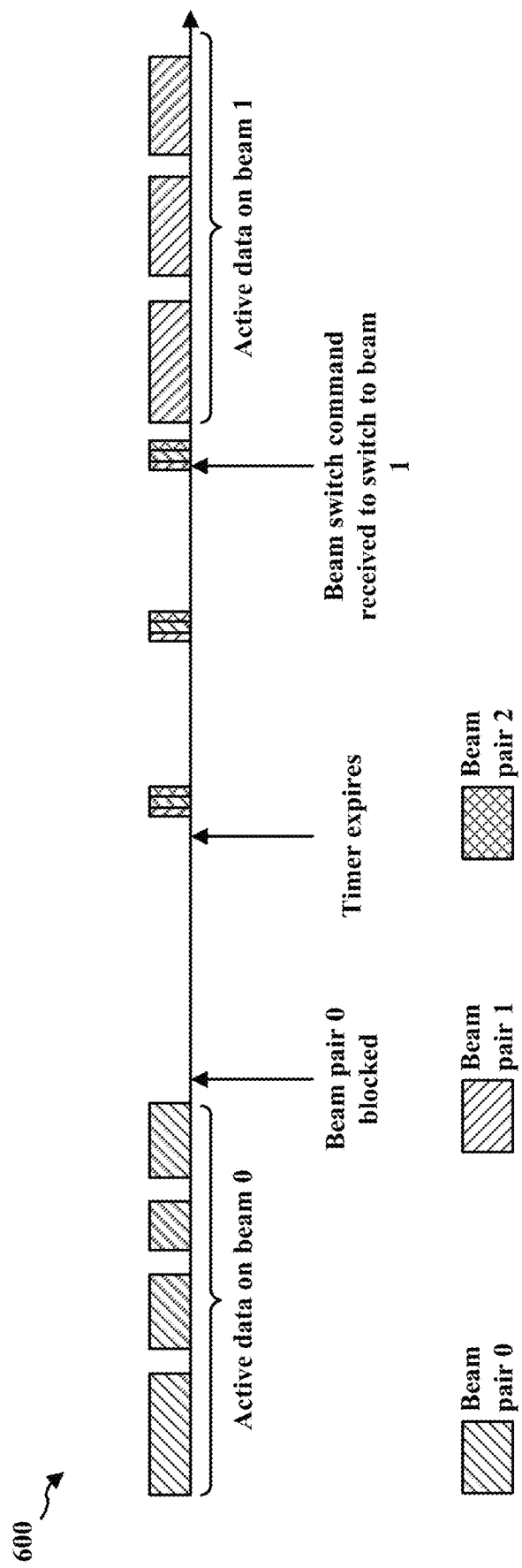
FIG. 6 is a diagram illustrating an example of active beams and beam switching.

FIG. 6 is a diagram 600 illustrating an example of active beams and beam switching. On the diagram, the x-axis may represent time. As illustrated in the diagram, active data may be transmitted on Beam pair 0. An example of the systems and methods described herein may serve the UE using a "best" known beam pair. The best beam pair may be a beam pair that has a figure of merit higher than some other beam pair or beam pairs. Figures of merit may include but are not limited to, bit-error-rate, received power, signal-to-noise ratio, other error rates, or any other measurable attribute that may be used to select a beam pair. It will be understood that the selected beam pair may be a "best" beam pair among a number of beam pairs, but not necessarily of every possible beam pair between the serving BS and UE. The systems and methods described herein may provide a mechanism or mechanisms to switch the UE to a different beam when blockage happens.

At a point in time, Beam pair 0 may be blocked. For example, due to movement of the UE, a building, hill, or another object may be between the UE and the serving base station along the path blocking one or more signals transmitted and/or received on Beam pair 0.

When Beam pair 0, which is a beam pair being used for communication between the base station and the UE, is blocked, a timer will not reset, e.g., because grants will no longer be received on Beam pair 0. Accordingly, because the timer will not be reset, eventually, the timer will expire. Accordingly, the UE may enter a beam sweeping mode when the timer expires.

In an aspect, when a beam pair is blocked, but the base station wants to switch to a different beam pair corresponding to the same UE side beam, no extra work is needed by the UE. That is, the base station wanting to switch to a different beam pair corresponding to the same UE side beam is transparent to the UE.

When the base station wants to switch to a different beam pair that does not correspond to the same UE side beam, the beam switch may be more complicated. Switching to a different beam pair that does not correspond to the same UE side beam is not transparent to the UE. One complication with switching the UE to a beam pair with a different UE side beam may be because, when the beam pair is "broken," the base station can no longer communicate with the UE anymore (at least not over the broken beam). A beam pair may be broken when one or more wireless communication devices cannot send and/or receive over the particular beam. A UE will not listen to other beams unless scheduled. Accordingly, the base station may no longer be able to communicate with the UE.

In an aspect, a UE may be configured to perform a sweeping mode, e.g., to recover when a beam being used is blocked. In the sweeping mode, the UE may sweep through a series of beam pairs, e.g., Beam pair 0, Beam pair 1, Beam pair 2. The sweeping mode may allow for faster recovery when no grant has occurred for a certain period of time, e.g., as determined by a timer. The UE may enter the beam sweeping mode when the timer expires. The timer may be reset when a grant is received by the UE from the base station.

In an aspect, the sweeping pattern and timing of the sweeps may be configured by the base station. The sweeping pattern and timing may be based on the beam pair set. The sweeping pattern may be an order of a beam sweep. The sweep timing may include one or more of time between beam changes, active beam time for a beam or beams, timings of when no beams are active, or other beam sweep timing information. When the base station discovers the current beam pair (between a UE and the base station) is broken, the base station may try to send a beam switching command to the UE at the UE's beam sweeping time. In an aspect, there might be some connection with connected discontinuous reception (C-DRX) and wakeup. For example, in a C-DRX cycle, a UE may have an ongoing communication (e.g., voice call). Voice communications may be discontinuous. The C-DRX cycle may include an off time for the UE to sleep, e.g., when a user is not speaking. The UE may wake up when a user is speaking.

Referring back to FIG. 6, in the illustrated example, there are three beam pairs (Beam pair 0, Beam pair 1, Beam pair 2) in the "active link set." The three beam pairs may be of different strengths. In an example, Beam pair 0 may be the "best," e.g., have the highest BER, SNR, or some other figure of merit.

In the illustrated example, the PDSCH/PUSCH is be being served over Beam pair 0. The PDCCH may carry the DL/UL grant DCI in Beam pair 0. The PUCCH carries UCI in Beam pair 0.

On the UE side, the UE side beams for the three beam pairs are Beam pair 0, Beam pair 1, and Beam pair 2, respectively. For normal operation, only Beam pair 0 is used, but the base station may configure the UE to sweep in a particular pattern when there is no grant received for certain period of time. The grant reception may reset the timer. Timer expiration may switch the UE to a beam sweeping mode using a preconfigured beam sweep pattern (period, offset, beam used, beam on time, beam off time, or other attributes of beam sweeping).

Figure 7:
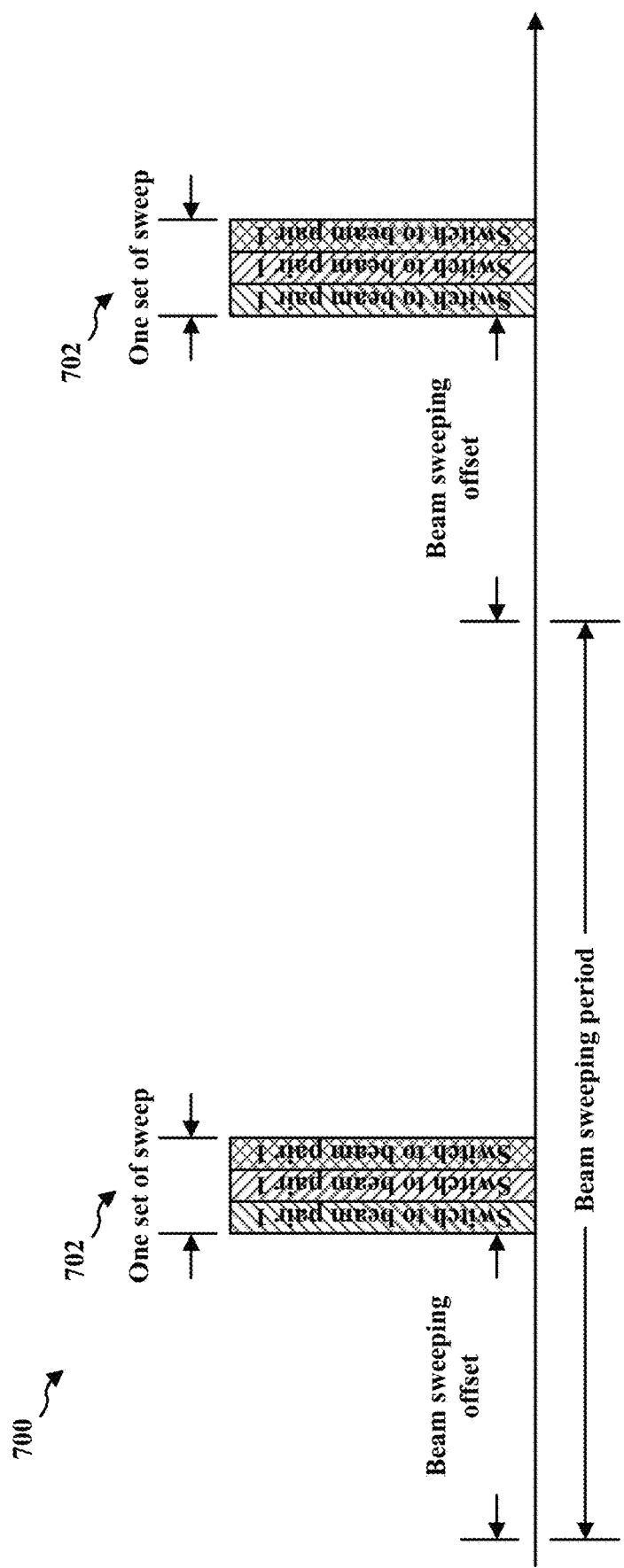
FIG. 7 is a diagram illustrating an example of a direct beam sweeping mode.

FIG. 7 is a diagram 700 illustrating an example of a direct beam sweeping mode. In the direct beam sweeping mode, the base station knows which other UE side beam to switch to, and the base station may directly send the beam switching command during a beam sweeping period of the UE. The beam switching command may be sent using the matching base station side beam. In an example, the base station may want to repeat the beam switching command in all beam pairs 702, as illustrated in FIG. 7. In another example, the base station may want to repeat the beam switching command in a subset of beam pairs 702 other than all beams, e.g., one beam, two beams, three beams, four beams, five beams.

During the beam sweep, the UE may attempt to decode the beam switching command. For example, the UE may attempt to decode the beam switching command. The beam switching command may be in the form of a PDCCH, e.g., in a field in the PDCCH payload. In an aspect, the beam switching command may be transmitted in each beam of the beam sweeping mode.

When a beam switching command is detected, the UE may exit the beam sweeping mode and change the UE side beam specified in the beam switching command and monitor for PDCCH and PDSCH on the specified beam. A benefit of the systems and methods described herein may be faster switching due to less signaling overhead. Potential issues may be that the second best UE side beam is from previous knowledge and the second best UE beam may not be second best anymore (or perhaps may not even provide a connection). For example, the second best beam may be blocked at the same time the best beam is blocked. Accordingly, the beam switching may fail if the previously determined second beast beam is blocked as well.

In another aspect, selective beam switching may be used. In selective beam switching, the base station may want to determine which beam is good before sending out the beam switching command. In the first cycle, the base station may send a set of beam reference signal (BRS) to enable the UE to measure the beam pair 702. The beam sweeping may be paired with a set of PUCCH transmission opportunities.

In an aspect, for each beam pair, a base station may send a BRS on a transmit beam and may monitor a corresponding receive beam of the beam pair. The base station may tune to a corresponding receive beam of the beam pair to receive the measurement from UE to monitor the corresponding receive beam of a particular beam pair. The UE may detect and measure the BRS during the beam sweeping. At the base station, at a committed or predetermined RX timing, the UE may send the measurement report back. For example, a base station may configure a UE to transmit at a particular time. The base station may then tune to that RX beam of the UE at that particular time for reception of the UE transmission. The base station may receive the measurement report and based on the measurement report send the beam switching command to switch to the selected beam pair of the beam pairs 702. The selective beam switching approach may be more complex, as the selective beam switching approach may need multiple rounds of beam pair 702 sweeping for the testing, e.g., to determine which beam pair of the beam pairs 702 to switch to. However, the selective beam switching approach may be more reliable as the switching decision may be based on a recent measurement.

Figure 8:
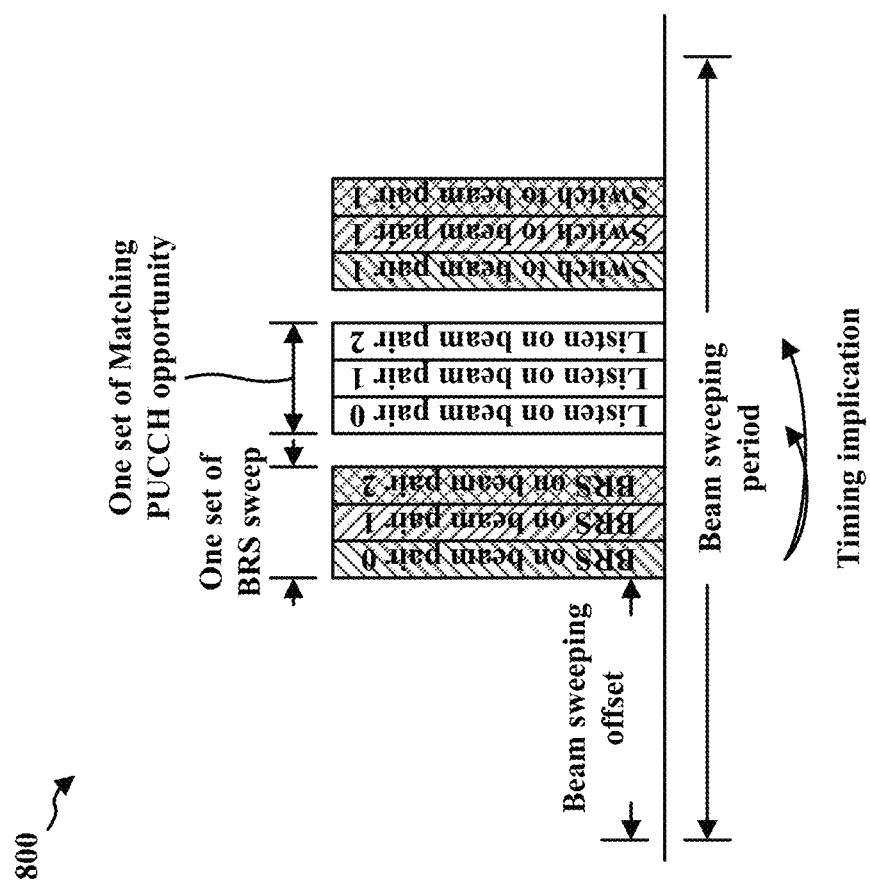
FIG. 8 is a diagram illustrating an example of a beam sweeping mode with a decision at the base station side.

FIG. 8 is a diagram 800 illustrating an example of a beam sweeping mode with a decision of which beam pair to use made at the base station side. When a decision of which beam pair to use is made at base station side, the UE may report measurements of results for each beam pair (e.g., power received or other indication of a quality of a beam in the beam pair) to the base station. The UE may not need to report measurements for all beams, however. The base station may receive the measurements and make the beam switching decision. Additionally, the base station sends the beam switching command to the UE. In an aspect, not all beams need to be used. There may be an implied timing between the BRS sweeping, PUCCH monitoring, and sending of the beam switching command. One example of timing between the BRS sweeping, PUCCH monitoring, and the beam switching command is illustrated in FIG. 8. In the illustrated example, a set of beam pairs (e.g., beam pair 0, 1, 2) may be swept to determine BRS. The beams may then be swept to listen on each of the beam pairs (e.g., beam pairs 0, 1, 2). For example, one set of matching PUCCH opportunities may be swept. A UE may then switch to one of the sets of beam pairs (e.g., beam pair 0, 1, 2).

Figure 9:
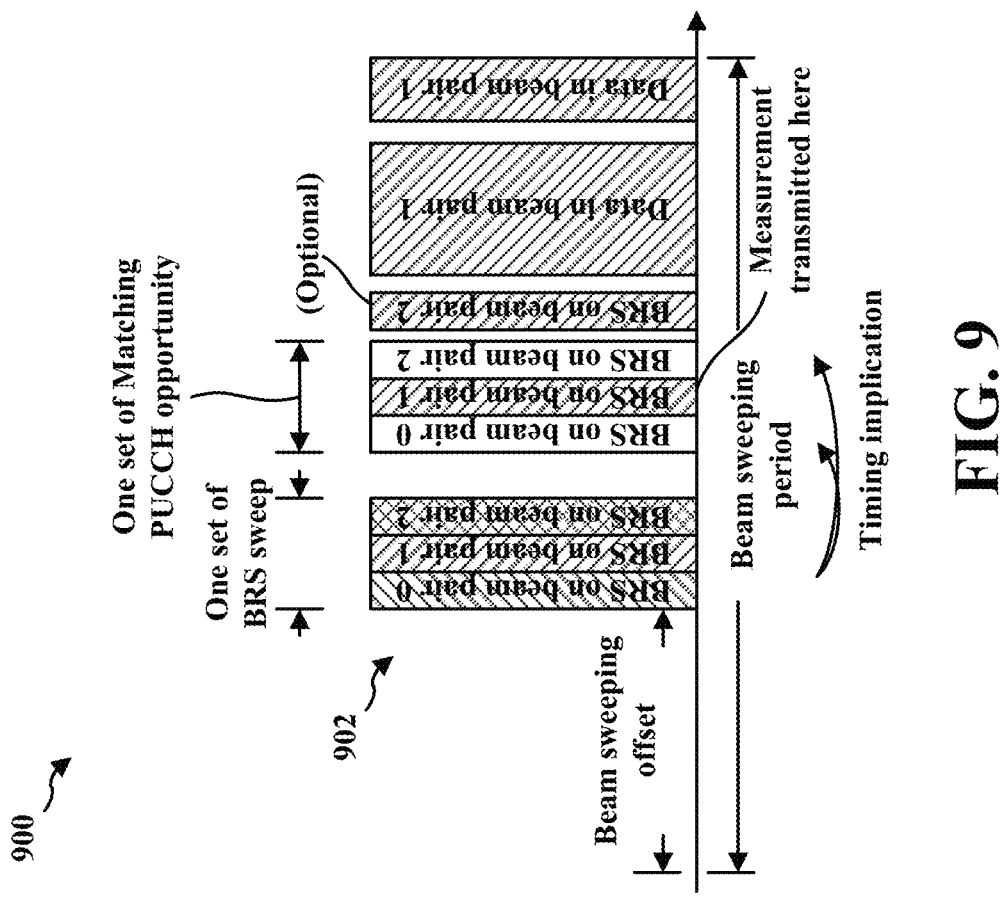
FIG. 9 is a diagram illustrating an example of a beam sweeping mode with a decision at the UE side.

FIG. 9 is a diagram 900 illustrating an example of a beam sweeping mode with a decision of which beam pair to select at the UE side. When a decision is made at the UE side, the UE may perform the measurement of a property of the beam pairs (power, bit-error-rate over a beam pair, signal-to-noise ratio, other properties or combinations of properties) and pick one beam pair based on the measured property. The UE may send the measurement report at the corresponding timing with the selected beam pair. For example, data sent may indicate the selected beam pair and the measurement of the selected beam pair. In other examples, the measurements for multiple beam pairs may be sent along with an indication of the selected beam pair. In some examples, the criteria for selection may be known, and the base station may determine the beam pair selected at the UE based on the measurements received. Additionally, the UE may switch to the selected beam for future monitoring. The base station may also receive the measurements, e.g., on a current beam pair prior to switching to the selected beam pair (if needed). Switching may not be needed when the current beam pair is the selected beam pair. The base station may either directly start to use of the selected beam pair for future data or may send the beam switching command to confirm the UE beam pair choice. There may be pre-configured or predetermined timing between the BRS sweeping, PUCCH monitoring, and the beam switching command. One example of timing between the BRS sweeping, PUCCH monitoring, beam switching command is illustrated in FIG. 9.

In an aspect, when, within a time duration t0, a UE does not receive a grant, then the UE enters a beam sweeping mode. The UE may maintain a timer based on setup information received from the base station. The base station may also maintain a timer. The timer at the base station may be reset when a grant is transmitted successfully (as is the timer at the UE), e.g., based on an indication from the UE to the base station that the grant was successful.

In an aspect, resetting the timer may be based on at least one of a grant from a base station, a detected PDCCH transmission, or other detected downlink transmission, including a transmission of a reference signal. In an aspect, resetting the timer may be based on reception of an acknowledgment comprising a PUCCH or PUSCH corresponding to a grant transmitted from the base station, or a detection of a pre-configured uplink transmission from a user equipment (UE). Some examples may include semi-persistent scheduling (SPS), sounding reference signals (SRS), or scheduling request (SR).

In an aspect, an acknowledge (ACK) may be received or detected for PDSCH or PUSCH in response to an UL grant, or an ACK may be inferred when any periodic PUCCH from the UE is detected. The base station may configure how the UE sweeps when the UE enters the beam sweeping mode. Aspects of how the UE sweeps that may be configured include, but are not limited to, the timing period, timing offset, and sweeping pattern (which beams to sweep and in which order). The beam sweeping pattern may be derived from the active beam pair list. For example, a list of beams may be known. A list of active beam pairs may be determined from the known beam pair list. The beam pairs may be swept in an order from the list. The order may be random, in an angle order, or some other order of beam pairs.

In an aspect, the base station may serve the UE using the best beam pair of the series of beam pairs 902. When the beam pair is suddenly blocked, the base station may discover the block, based on a timer that may be started from some time instance. The timer may measure a time from a last successful received transmission. When the time is greater than a predetermined value, the current beam pair may be blocked. Because of the block, the grant transmitted will see no response. For example, a blocked beam pair may be transmitted from one device, but may not be received at another device because a physical barrier or another block may keep the signal from being received.

In an aspect, the DL grant on the PDSCH may not see an acknowledge in a PUCCH. The UL grant may not see the PUSCH as a response, e.g., when the PUCCH does not include the acknowledge the UL grant may not be considered a response.

In an aspect, the base station may use an error counter or a timer to trigger a declaration that the best beam pair is blocked and switch to beam sweeping mode. For example, a counter may be started when a beam pair is selected. As signals are received over the selected beam pair, the counter may be reset. When signals are not received over the selected beam pair for a predetermined period, the timer may count above a predetermined value. The predetermined value may indicate that a beam pair is blocked.

In an aspect, in the beam sweeping mode, the base station may know at which time the UE will listen to which beam, and may send the beam switch command at the proper time [for the selected beam pair. After sending the beam switching command, the base station may switch to the selected beam pair for traffic and resume data transmission.

In an aspect, from the UE perspective, the UE cannot tell when the lack of grant is because of the beam pair being blocked or because the base station has made a decision not to schedule the UE, e.g., due to no data to serve or no resource to serve.

In an aspect, when the beam pair is blocked, the UE cannot receive anything from the base station. When the base station makes the decision not to schedule the UE, the decision may be due to no data to serve or no resource to serve.

In an aspect, behavior on UE side may include configuring, by the base station, a setup-timer. The timer may provide a timer duration value. Whenever a valid grant is received, the UE may reset the timer. When the timer expires, the UE may enter the beam sweeping mode. During a beam sweep, the UE may cycle through configured beam pairs and attempt to decode a beam sweeping command or detect and measure BRS. After a few beam sweeping cycles have occurred, when nothing is received from the base station, the UE may consider that there is no traffic from the base station and enter a C-DRX mode. In an aspect, the default beam used to monitor the base station will not change.

Figure 10:
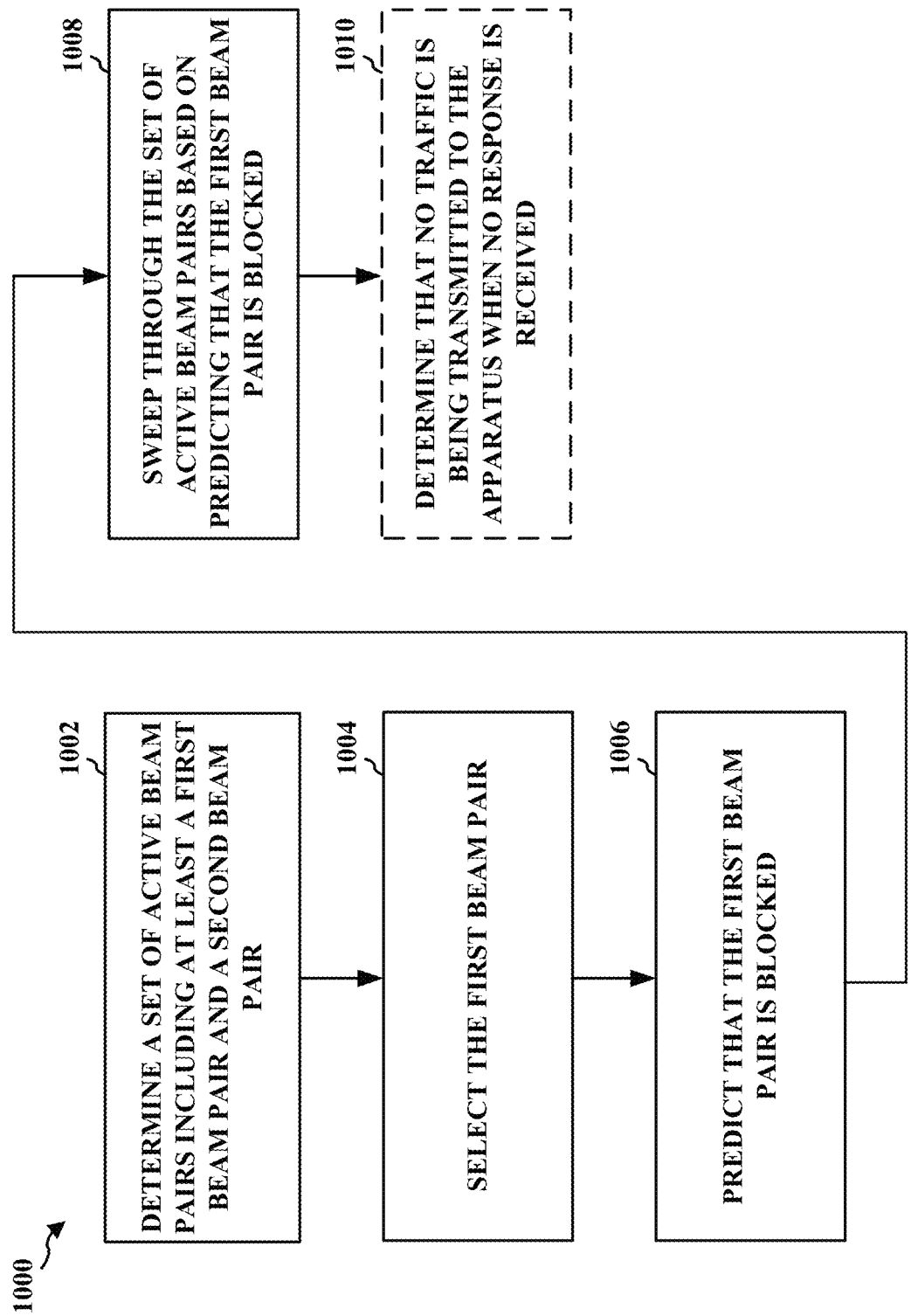
FIG. 10 is a flowchart of a method of wireless communication.

FIG. 10 is a flowchart 1000 of a method of wireless communication. The method may be performed by a UE or a base station (e.g., the UE 104, 350, 404/base station 102, 180, 310, 402). At 1002, the UE or the base station determines a set of active beam pairs including at least a first beam pair and a second beam pair. For example, the UE 104, 350, 404 or the base station 102, 180, 310, 402 determines a set of active beam pairs (pairs of beams from a subset of, e.g., 402*a-h*, 404*a-d*) including at least a first beam pair (e.g., 402*d*, 404*c*) and a second beam pair (e.g., 402*e*, 404*b*). For example, for the UE 104, 350, 404 determining a set of active beam pairs may include receiving a list of active beam pairs from a base station 102, 180, 310, 402. Alternatively, at the base station, 102, 180, 310, 402, determining the set of active beam pairs including at least the first beam pair and the second beam pair may include receiving measurements of beam reference signals from a UE and selecting the active beam pairs based on the measurements of beam reference signals. Determining the set of active beam pairs including at least the first beam pair and the second beam pair may include maintain a list of active beam pairs and determining possible beam pairs from the active beam pairs list that is maintained.

In an aspect, the apparatus may be further configured to determine a beam sweeping pattern. Determining the beam sweeping pattern may include receiving a timing period and offset to sweep a list of active beam pairs from a base station. For example, for an x second sweep pattern with four beam pairs to sweep, switched may occur every x/4 seconds. When a first beam sweep starts at a time y, switching beams may occur every x/4 seconds.

At 1004, the UE or the base station selects the first beam pair. For example, the UE 104, 350, 404 or the base station 102, 180, 310, 402 selects the first beam pair (e.g., 402*d*, 404*c*). For example, at the UE 104, 350, 404 selecting the first beam pair, may include the first beam pair being assigned to the UE 104, 350, 404, by a base station 102, 180, 310, 402. Alternatively, selecting the first beam pair may include selecting the first beam pair from the active beam pairs based on received measurements of beam reference signals, e.g., at the base station 102, 180, 310, 402, from the UE 104, 350, 404. Selecting the first beam pair (e.g., 402*d*, 404*c*) may include reviewing the beam pairs determined at 1002 and choosing from the beam pairs determined at 1002. The selection may be based on measurements of an attribute or attributes of the beam pairs, or individual beams of the beam pairs. The attributes may include, but are not limited to BER, SNR, power received, or other antenna transmission attribute. In some examples, a highest SNR or power received, or the lowest BER may be selected, for example. In some examples, a combination of multiple attributed may be selected.

At 1006, the UE or the base station predicts that the first beam pair is blocked, the prediction based on an expiration of a timer. For example, the UE 104, 350, 404 or the base station 102, 180, 310, 402 predicts that the first beam pair (e.g., 402*d*, 404*c*) is blocked. Predicting that the first beam pair is blocked may include activating a timer, resetting the timer based on a grant from a base station, and concluding that the first beam pair is blocked based on an expiration of the timer, e.g., without receiving a signal. Alternatively, at the base station, 102, 180, 310, 402, predicting that the first beam pair is blocked may include activating a timer at the base station, resetting the timer based on reception of an acknowledgement in the form of an, e.g., ACK or NACK which may be part of a PUCCH or PUSCH corresponding to a grant transmitted from the base station, and concluding that the first beam pair is blocked based on an expiration of the timer. Predicting that the first beam pair is blocked may include activating a timer, resetting the timer based on a grant from a base station, and concluding that the first beam pair is potentially blocked based on an expiration of the timer.

At 1008, the UE or a base station sweeps through the set of active beam pairs based on predicting that the first beam pair is blocked. For example, the UE 104, 350, 404 or the base station 102, 180, 310, 402 sweeps through the set of active beam pairs (pairs of beams from a subset of, e.g., 402*a-h*, 404*a-d*) based on predicting that the first beam pair is blocked (e.g., 402*d*, 404*c*). For example, at the UE 104, 350, 404, sweeping through the set of active beam pairs may include following the received timing period and offset to perform the beam sweeping following the order of the received list of beam pairs. For example, in an aspect, a time period and offsets may be pre-configured. The offset may be an offset in a time period. For example, a time period may be 80 ms in an example. The offset may be a 10 ms offset. Accordingly, beam sweeping may begin in one example, 10 ms after the start of each 80 ms time period. Using predetermined, preconfigured, or communicated parameters for time period and offset may allow the parameters to be used so that a UE may calculate when to sweep to check if anything is transmitted.

In an aspect, at the base station 102, 180, 310, 402, sweeping through the set of active beam pairs may be performed during the time UE is configured to sweep the active beam pairs. In an aspect, at the base station 102, 180, 310, 402, sweeping through the set of active beam pairs may include transmitting a beam switching command over the set of active beam pairs. In an aspect, sweeping through the set of active beam pairs may include transmitting a beam reference signal over the set of active beam pairs for the UE to measure. Sweeping through the set of active beam pairs may include one or more of following: a received timing period, offsetting to perform the sweep through the set of active beam pairs following an order of the received list of beam pairs, and determining a beam sweeping pattern. The beam pattern may be an order of beam pairs to be swept. For example, the beam pattern may sweep a numbered series of beam pairs in numerical order, reverse numerical order, a random numerical order, or some other beam pair order.

At 1010, the UE determines that no traffic is being transmitted to the apparatus when no response is received from a base station after a number of sweeps through the set of active beam pairs. For example, the UE 104, 350, 404 determines that no traffic is being transmitted to the apparatus when no response is received from a base station after a number of sweeps through the set of active beam pairs. Determining that no traffic is being transmitted to the apparatus when no response is received from a base station after a number of sweeps through the set of active beam pairs may include one or more of performing the number of sweeps and determining that no response is received for each pass.

In an aspect, the method further includes detecting a beam reference signal from a base station during the sweep through the set of active beam pairs, measure the beam reference signal, and transmit the measurement of the beam reference signal to the base station. In an aspect, a UE may provide a BSR to a base station. The BSR may indicate a size of data in a data buffer. The BSR may trigger downlink resource assignments from the base station.

In an aspect, the method further includes receiving a beam switching command from the base station. For example, the beam switching command may include one or more bits that indicate a beam switch is needed. The beam switch command may also include one or more bits to indicate which beam pair to use.

In an aspect, the method further includes selecting a beam pair from the set of active beam pairs based on beam reference signal. For example, a beam pair with a highest measured value of a signal property such as signal-to-noise ratio (SNR) a lowest measured value of a signal property such as bit-error-rate (BER), or a "best" attribute of another signal property may be selected.

Figure 11:
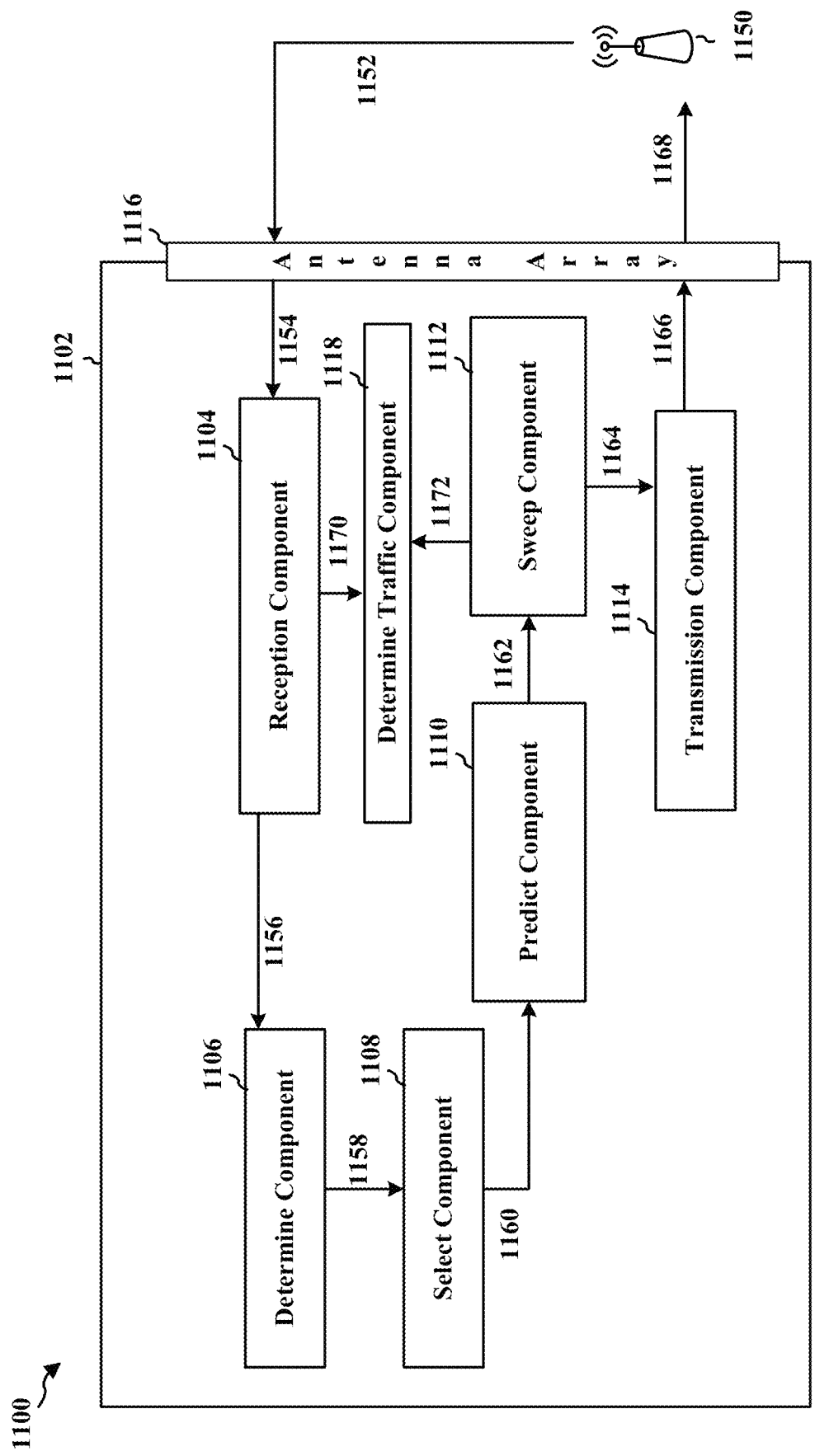
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE in communication with a base station 1150. The apparatus includes a component 1104 that receives signals 1154 from the antenna array 1116 (which may receive a signal 1152 from the base station 1150), a component 1106 that determines a set of active beam pairs (1158) including at least a first beam pair and a second beam pair based on signals 1156 from the reception component 1104, a component 1108 that selects the first beam pair and outputs a signal 1160 representing the selected first beam pair, a component 1110 that predicts that the first beam pair is blocked based on the signal 1160 and outputs the prediction 1162, a component 1112 that sweeps through the set of active beam pairs based on predicting that the first beam pair is blocked (1162), a component 1114 that transmits signals 1166 and passes sweep control signals 1164 from the sweep component 1112 to the antenna array 1116, and a component 1118 that determines that no traffic is being transmitted to the apparatus when no response is received, e.g., based on received signals 1170 (or a lack of received signals) and sweep signals 1172. The antenna array 1116 may be used to receives signal 1152 and pass the received signal 1154 to the reception component 1104. The antenna array 1116 may be used to transmit signal 1168 from the transmission component 1114 signal 1166.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
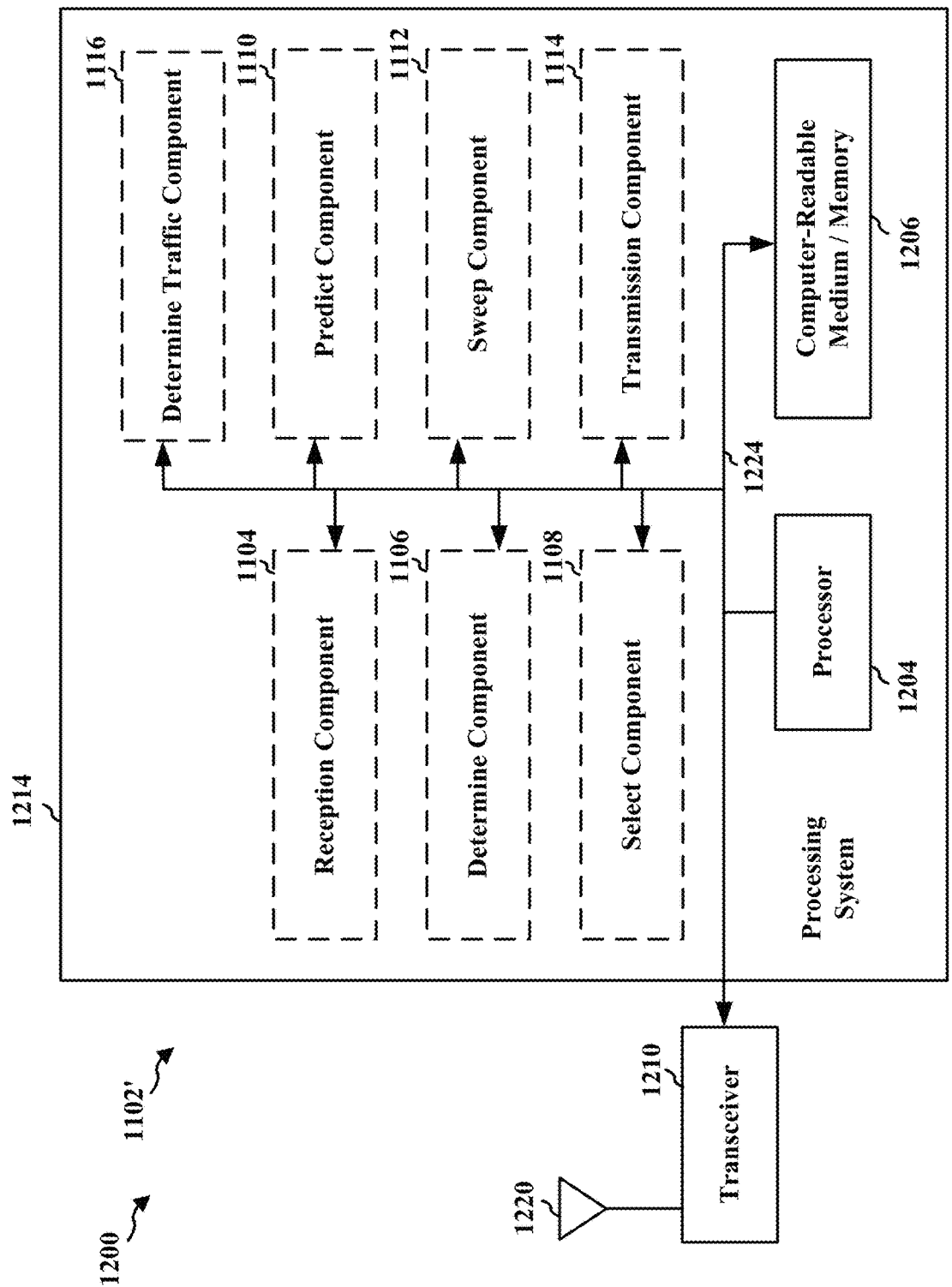
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, generally represented by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1118 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The one or more antennas 1220 may form an antenna array such as antenna array 1116 of FIG. 11. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1114, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118. The components may be software components running in the processor 1204, resident/stored in the computer-readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for determining a set of active beam pairs including at least a first beam pair and a second beam pair, means for selecting the first beam pair, means for predicting that the first beam pair is blocked, and means for sweeping through the set of active beam pairs based on predicting that the first beam pair is blocked. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. It is understood that the specific order or hierarchy of blocks in the processes/flowcharts may be rearranged based on design preferences. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a memory; and
at least one processor coupled to the memory and configured to:
determine a set of active beam pairs including at least a first beam pair and a second beam pair, the set of active beam pairs being based on a beamforming configuration by a base station;
select the first beam pair;
predict that the first beam pair is blocked, the prediction based on an expiration of a timer; and
sweep through the set of active beam pairs based on predicting that the first beam pair is blocked, the sweep through the set of active beam pairs being based on information received from the base station that indicates at least one of a timing period or an offset associated with time-domain separation between respective beams included in the set of active beam pairs.

2. The apparatus of claim 1, wherein the apparatus is further configured to determine a beam sweeping pattern.

3. The apparatus of claim 1, wherein the apparatus comprises a user equipment (UE).

4. The apparatus of claim 3, wherein the determination of the set of active beam pairs comprises reception of a list of active beam pairs from the base station.

5. The apparatus of claim 3, wherein the selection of the first beam pair comprises reception of information from the base station indicating assignment of the first beam pair.

6. The apparatus of claim 3, wherein the prediction that the first beam pair is blocked comprises to:

activate the timer, and one of:
reset the timer based on at least one of a grant from the base station, a detected physical downlink control channel (PDCCH) transmission, or other detected downlink transmission, including a transmission of a reference signal, or
conclude that the first beam pair is blocked based on an expiration of the timer.

7. The apparatus of claim 3, wherein the sweep through the set of active beam pairs comprises to follow a received timing period and offset to perform the sweep through the set of active beam pairs following an order of a received list of beam pairs.

8. The apparatus of claim 3, wherein the at least one processor is further configured to determine that no traffic is being transmitted to the apparatus when no response is received from the base station after a number of sweeps through the set of active beam pairs.

9. The apparatus of claim 3, wherein the at least one processor is further configured to:
detect a beam reference signal from the base station during the sweep through the set of active beam pairs,
measure the beam reference signal, and
transmit the measurement of the beam reference signal to the base station.

10. The apparatus of claim 9, wherein the at least one processor is further configured to receive a beam switching command from the base station.

11. The apparatus of claim 9, wherein the at least one processor is further configured to:
select a beam pair from the set of active beam pairs based on the beam reference signal.

12. A method of wireless communication, comprising:
determining a set of active beam pairs including at least a first beam pair and a second beam pair, the set of active beam pairs being based on a beamforming configuration by a base station;
selecting the first beam pair;
predicting that the first beam pair is blocked, the prediction based on an expiration of a timer; and
sweeping through the set of active beam pairs based on predicting that the first beam pair is blocked, the sweeping through the set of active beam pairs being based on information received from the base station that indicates at least one of a timing period or an offset associated with time-domain separation between respective beams included in the set of active beam pairs.

13. The method of claim 12, wherein the sweeping through the set of active beam pairs further comprises determining a beam sweeping pattern.

14. The method of claim 12, wherein the method is implemented in a user equipment (UE).

15. The method of claim 14, wherein the determining the set of active beam pairs comprises receiving a list of active beam pairs from the base station.

16. The method of claim 14, wherein the selecting the first beam pair comprises receiving information from the base station indicating assignment of the first beam pair.

17. The method of claim 14, wherein the predicting that the first beam pair is blocked comprises:
activating the timer, and one of:
resetting the timer based on a grant from the base station, or
concluding that the first beam pair is blocked based on an expiration of the timer.

18. The method of claim 14, wherein the sweeping through the set of active beam pairs comprises following a received timing period and offset to perform the sweep through the set of active beam pairs following an order of a received list of beam pairs.

19. An apparatus for wireless communication, comprising:
means for determining a set of active beam pairs including at least a first beam pair and a second beam pair, the set of active beam pairs being based on a beamforming configuration by a base station;
means for selecting the first beam pair;
means for predicting that the first beam pair is blocked, the prediction based on an expiration of a timer; and
means for sweeping through the set of active beam pairs based on predicting that the first beam pair is blocked, the means for sweeping being configured to sweep through the set of active beam pairs being based on information received from the base station that indicates at least one of a timing period or an offset associated with time-domain separation between respective beams included in the set of active beam pairs.

20. A non-transitory, computer-readable medium storing computer executable code, comprising code to:
determine a set of active beam pairs including at least a first beam pair and a second beam pair, the set of active beam pairs being based on a beamforming configuration by a base station;
select the first beam pair;
predict that the first beam pair is blocked, the prediction based on an expiration of a timer; and
sweep through the set of active beam pairs based on predicting that the first beam pair is blocked, the sweep through the set of active beam pairs being based on information received from the base station that indicates at least one of a timing period or an offset associated with time-domain separation between respective beams included in the set of active beam pairs.

* * * * *